May 6, 1947.　　　B. H. WILDMAN　　　2,419,978
PHOTOGRAPHY SYSTEM
Filed Feb. 2, 1942　　　2 Sheets-Sheet 1
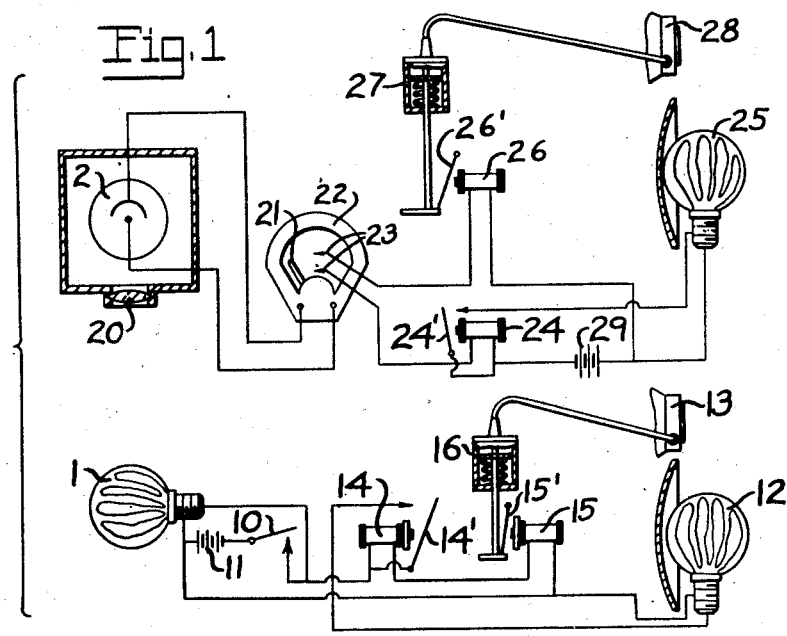
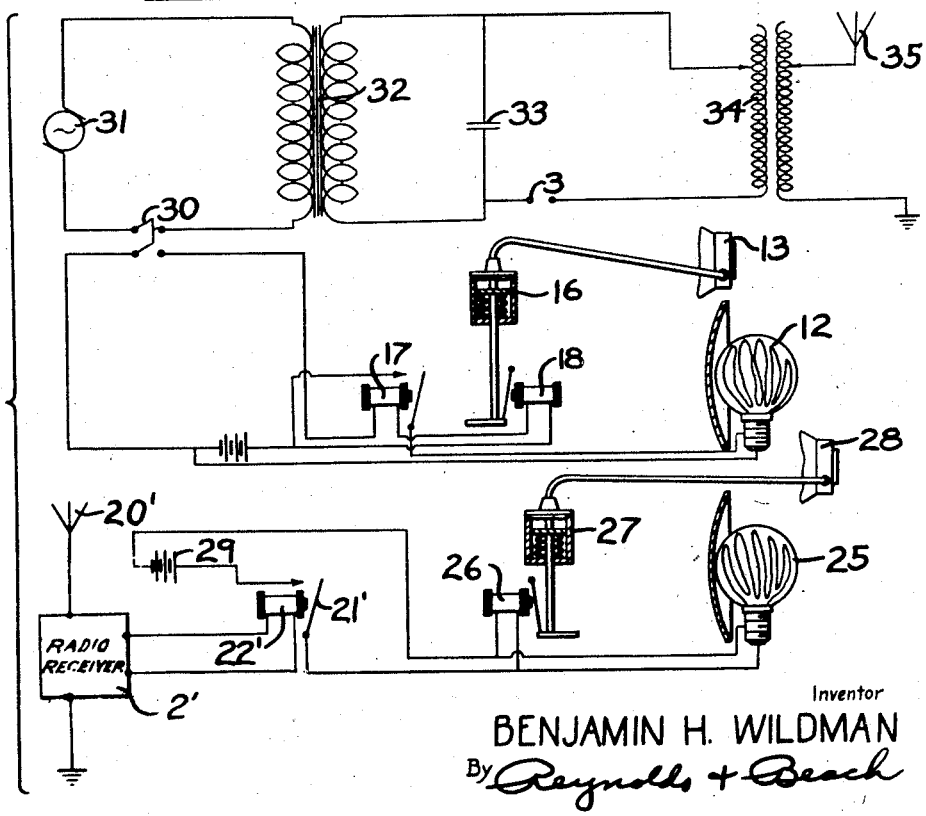
Inventor
BENJAMIN H. WILDMAN
By Reynolds + Beach
Attorneys

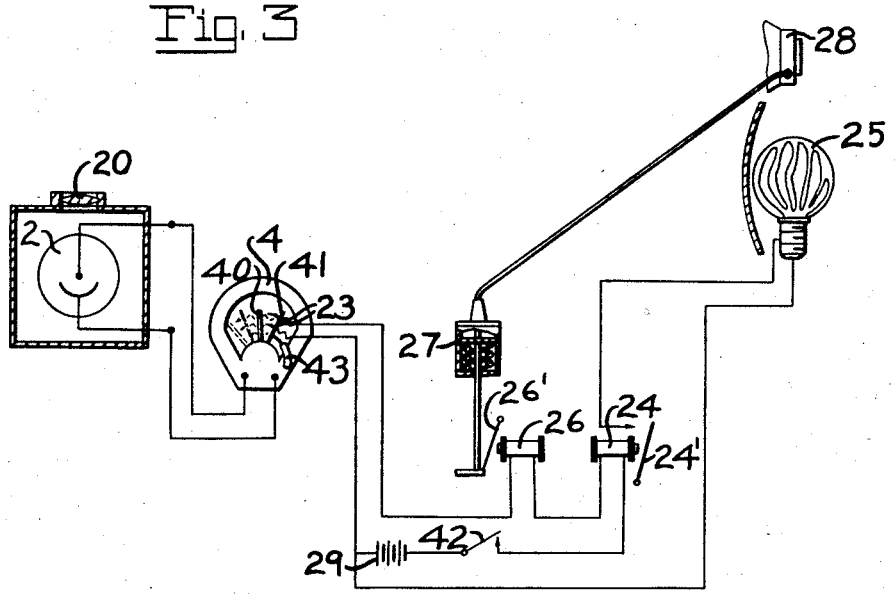
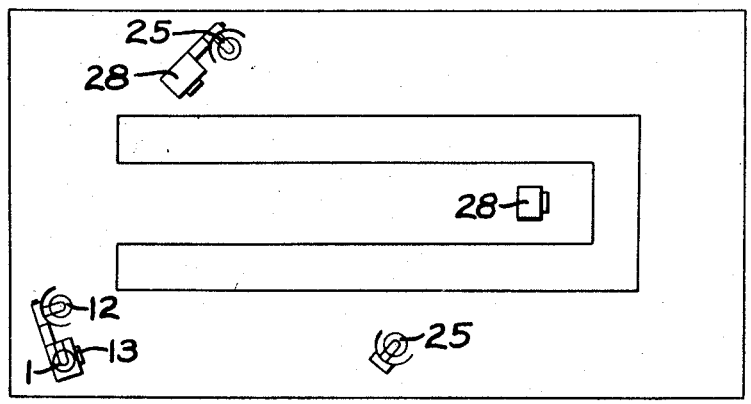

Patented May 6, 1947

2,419,978

UNITED STATES PATENT OFFICE 2,419,978

PHOTOGRAPHY SYSTEM

Benjamin H. Wildman, Seattle, Wash., assignor of one-half to Charles L. Reynolds and Robert W. Beach, both of Seattle, Wash.

Application February 2, 1942, Serial No. 429,264

8 Claims. (Cl. 67—29)

My invention relates to a system for photographing scenes or audiences of a size too large for proper illumination from a single source, or which it is desired to photograph simultaneously from different angles or locations. This application is a continuation in part of my application Serial No. 289,811, filed August 12, 1939, now Patent No. 2,272,102, for an Illumination system and method for photography.

Heretofore it has been customary to photograph scenes by briefly opening a camera shutter and simultaneously illuminating the scene with a single bulb of the flash type. For this purpose mechanism such as shown in Mendelsohn Patent No. 2,204,424 has been employed to synchronize properly the opening of the camera shutter and the energization of the flash bulb, account being taken of the relative lengths of time required to actuate the camera shutter mechanism and the flash bulb, and for the flash bulb to reach its peak intensity of illumination. In the use of my system it is necessary not only to synchronize the operation of a single flash bulb and camera shutter, but also to synchronize such operation with that of other units incorporating flash bulbs, or other cameras arranged to photograph the same scene, or both such bulbs and cameras, which units are located at a distance.

In order to effect this purpose the units at all stations are controlled from a master unit, and appropriate time delay mechanism may be provided in order to achieve absolute precision of synchronization. For most uses such precision is not required, but may become necessary where objects in the scene are in motion.

Whether each slave unit incorporates only a flash bulb, or only a camera, or both, it is self-contained as described in my above-mentioned application. By self-contained I mean that the several slave units may be actuated by a master unit without the control mechanism for the slave units being directly interconnected with the master unit controls either mechanically or electrically. Each slave unit may, of course, derive its required electric power from the building wiring, and the several units in such event would be electrically interconnected through these circuits, but control over the operation of the units is entirely independent of the power wiring. My control system is therefore just as well adapted for units which have individual batteries.

Preferably control over each slave unit is accomplished by a photo-sensitive device, such as a photo-electric cell, energized by a light source in the master unit. Alternatively other forms of radiant or wave energy, such as a radio control, may be employed for effecting such slave unit control. Whichever type of control is used it is unnecessary, in placing the slave units, to run wires from them to the master unit, and their operation cannot fail because of someone tampering with a control wire. Each slave unit may thus be located quickly and positioned to obtain the most desirable effect. However many slave units may be used, or in whatever pattern they may be arranged, no overloading of the master unit control mechanism can result.

Despite reliance on the functioning of a photo-sensitive device in each slave unit for its actuation, I may provide mechanism which will insure operation of the slave units by light energy from the master unit even under daylight conditions if the light source of the master unit provides somewhat more intense illumination than such daylight. Where the natural light is more intense than the master unit light source there would, of course, be no necessity for auxiliary, artificial illumination of the scene.

As stated in my above-mentioned application, the same principles may be employed for operating several cameras, differently located, simultaneously, as for energizing several flash bulbs. Thus, for taking news photographs, a variety of pictures of the same scene may be taken from different angles so that at the same instant, for instance at the climax of a ceremony, photographs of the scene may be taken from various points of vantage. One of the cameras may contain a master key or a master key may be associated with its shutter, and slave units may be associated with the shutters of the other cameras, such as by operating a Mendelsohn synchronizer of the type shown in the above-mentioned Mendelsohn patent. These several slave units will be energized by the action of operating the shutter of the master camera, and all the plates will be exposed simultaneously. For such purposes, while artificial illumination may be required, in order to avoid the possibility of undue light intensity in front of the lens of any one of the cameras, the radio transmission control may be found the preferable means of transmitting the action from one camera to the other.

Several different embodiments of my invention are shown in the drawings all employing the same underlying principles of operation.

Figure 1 is a diagram of a master unit, and of a slave unit which may be one of several similar units, and indicates the cooperative relationship between them accomplished by the use of a photo-sensitive device and an energizing light source.

Figure 2 is a diagram of a master unit, and of a slave unit which may be one of several similar units, incorporating control mechanism of the radio transmission type.

Figure 3 is a diagram of a modified type of slave unit actuated by a photo-sensitive device, which unit may be used with and energized by the master unit of Figure 1 in place of the slave unit shown in such figure.

Figure 4 is a diagrammatic plan view showing a typical disposition of master and slave units about a banquet scene to be photographed, one of the slave units incorporating both a camera and a light source, another slave unit having only a light source, and still another slave unit having only a camera.

The arrangement described in my above-mentioned application is satisfactory for general purposes, for ordinarily rapidly moving objects are not present in the scene. The exposure time of the camera in such instances would be about ⅕ of a second, and not less than ¹⁄₂₅ of a second. The delay occasioned by operation of a slave unit flash globe would not lag sufficiently behind the flash of the master unit globe to prevent peak illumination by both while the camera shutter is open. Where a very short shutter opening period is used, however, such as ¹⁄₁₀₀ of a second or less, the slave unit flash globe would not have sufficient time to build up to its peak intensity prior to closing of the camera shutter. Under such circumstances it is desirable to delay operation of the master unit light used to illuminate the scene until illumination of the slave unit light source has been initiated.

Where a photo-sensitive device slave unit control is employed two light sources may be provided in the master unit, one for energizing the photo-sensitive device, and the other for illuminating the scene simultaneously with energization of the slave unit light source. As shown in Figure 1, the master unit will include a slave unit energizing light source 1 which may be a flash globe located to shine upon a photo-sensitive device, such as a photo-electric cell unit 2, through a proper focusing lens 20. The photo-electric cell may be of any known type either of the self-generating type or of the electron valve type as may be most suitable. In the latter case, of course, the unit would include a power source, as well as such other conventional mechanism as may be desirable to operate the galvanometer 22. The light 1 may be energized at will by closing a switch 10 which will complete a circuit through this light from any suitable power source, illustrated as battery 11. Such power source may instead be a conventional alternating current power outlet.

The instant that flash globe 1 is illuminated photo-electric cell 2 will be energized by the light received from it. The electric current thus generated by the photo-electric cell may swing the needle 21 of a galvanometer 22 in circuit with it. Swinging of this needle will bridge the gap between switch points 23 to energize the photographic exposure means of the slave unit. Within the term photographic exposure means I include either a source of illumination, such as a flash globe, or a camera shutter release, or both. Photographic exposure of a sensitized surface to a scene has two prerequisites; first, the uncovering of the sensitized surface facing the scene, and second, the activation of such surface by light reflected from the scene. Thus if the sensitized surface is uncovered, photographic exposure is accomplished by illumination of the scene. Alternatively if the scene is brightly illuminated, photographic exposure of the sensitized surface is accomplished by uncovering it. Photographic exposure may also, of course, be accomplished by simultaneously illuminating the scene sufficiently and uncovering the sensitized surface.

In the arrangement shown in Figure 1 bridging of the switch points 23 by needle 21 closes a circuit through two relays arranged in parallel, of which relay 24 controls illumination of the light source, such as flash globe 25, while relay 26 actuates a spring operated release 27 for the camera 28. Energization of relay 24 attracts its armature 24' to close a switch completing a circuit from the power source 29 through the flash globe 25. Again while this power source has been indicated as a battery, a conventional alternating current outlet may be substituted. Energization of relay 26 will attract its armature 26', which serves as a catch holding the spring of the shutter release 27 in compressed position. When it is desired to reset the release it is merely necessary to pull out the shutter cable, thus compressing the spring, and again to engage armature 26' in the manner shown.

It will be evident that it requires a fraction of a second for the galvanometer needle 21 to swing and for the relays 24 and 26 to operate. By that much, therefore, illumination of flash globe 25 for actuation of the shutter of camera 28 will lag behind illumination of flash globe 1. Where a very short exposure time is desired, therefore, a second flash globe 12 may be provided in the master unit to illuminate the scene. Ordinarily also a camera 13 will be located at the master unit. Energization of flash globe 12 will not be initiated until relay 14 closes a circuit from this globe through battery 11 by attraction of its armature 14' into switch closed position. Similarly, the shutter of camera 13 will not be released until relay 15 is energized to actuate the spring operated camera release 16 by movement of the relay armature 15' serving as a latch for the camera release.

Relays 14 and 15 are connected in parallel circuit with flash globe 1, so that their energization is initiated at the same time such flash globe is energized. The relay armatures 14' and 15' will not be moved immediately, however, because, as indicated, the relays are of the time-delay type, and these will be adjusted so that the flash globe 12 will be synchronized precisely with flash globe 25 of each slave unit, and the shutters of cameras 13 and 28 will be actuated exactly simultaneously and in proper synchronism with illumination of flash globe 25. The operating mechanism will, of course, be precisely the same whether the slave unit has only an illumination source, such as the flash globe 25, or a camera such as 28, or both. Since each slave unit is actuated by illumination of flash globe 1, no greater load is placed on the master unit if a large number of slave units are used than when only a single such unit is required.

Similarly the arrangement or proximity of the slave units to the master unit does not affect the load, nor do varying distances between the several slave units and the master unit complicate the problem of synchronization. The slight delay in actuation of each slave unit is caused by the delay in build-up of light intensity from flash globe 1 and the time required for operation of the slave unit relays. It does not take appreciably longer to energize a photo-electric cell 2 in a slave unit which is far removed from the light 1 than a photo-electric cell next to the light, such difference in time resulting only from the difference in degree of build-up in intensity of illumination required.

As illustrative of a control employing a type of wave or radiant energy different from light, a radio transmission control is shown in Figure 2. Instead of using a flash globe as the transmitter, a suitable radio wave transmitter, represented by the spark gap 3, serves as a source of oscillations, which is energized by closing the master control switch 30 in circuit with an alternator 31, transformer 32, condenser 33, and coils 34. The control switch 30 also completes a circuit through relays 17 and 18 whose function is similar to that of relays 14 and 15 described in connection with the arrangement of Figure 1. The radio energy is transmitted by the antenna 35 to a receiving antenna 20' in circuit with a suitable radio receiver 2', serving as the receiver for the radio energy. The current thus received actuates a relay 22' to close the circuit through flash globe 25 and camera shutter relay 26 by attraction of armature 21'. The particular type of radio transmitter and receiver employed are not part of my invention.

In this instance it is not necessary to make relays 17 and 18 in the master unit of the time-delay type, for there is no appreciable lag in energization of the radio circuit shown. Upon closing of switch 30, therefore, the master unit relays 17 and 18 and the slave unit relays 22' and 26 all operate exactly simultaneously for all practical purposes, and hence if the shutter release devices 16 and 27 are properly adjusted the shutters of cameras 13 and 28 will be actuated simultaneously and in accurate synchronism with illumination of both flash bulbs 12 and 25.

As in the previously described form of my device, either the camera 28 or the illumination source 25 may be omitted from the slave unit. Similarly either the illumination source 12, or the camera 13, or both, may be omitted from the master unit. In this instance, the radio transmitter and the attuned slave unit receiver replace the flash globe 1 and photo-sensitive device 2 of the modified form of Figure 1. The particular form of wave or energy mechanism for effecting control of the slave units by the master unit is not important, although ordinarily the flash globe and photo-sensitive device combination is preferable. The light sources for illuminating the scene need not even be of the flash type, but may be spot lights or flood lights energized in the same way.

In my previous application shutters were employed over the lens 20 of the photo-electric cell 2 in order to control the intensity of the illumination admitted to the cell. An intensity control is not necessary where the scene is only dimly illuminated prior to photographic exposure, and under such circumstances the arrangement of Figure 1 is quite satisfactory. Where the scene is reasonably well illuminated, either artificially or by daylight, prior to photographic exposure, however, the arrangement shown in Figure 3 may be used advantageously. Only the slave unit is illustrated, which can be energized by a master unit of the type shown in Figure 1.

In this slave unit the double galvanometer 4 replaces the galvanometer 22 of the device shown in Figure 1. This galvanometer has two needles 40 and 41, each forming part of a complete galvanometer unit of conventional type connected in circuit with the photo-electric cell unit 2. One of these pointers, for example 41, carries contacts 23 which may be bridged by the other needle 40. Prior to actuation of the master unit the photo-sensitive device 2, on being exposed to illumination of constant intensity, will be energized to actuate both galvanometer units, thus to move both needles 40 and 41 conjointly. A safety switch 42 incorporated in the power circuit may be opened to prevent inadvertent energization of the slave unit by bridging of contacts 23 while setting up such unit.

When the intense illumination of the master unit light source further energizes the photo-electric cell 2 needle 40 will be moved freely by its galvanometer unit into bridging contact with contact points 23, because needle 41 will be held by a dash pot 43 or equivalent movement retarding arrangement against any substantial movement in response to a corresponding change in current in its galvanometer unit. Thus while the needle 40 will be free for instantaneous movement in response to energization of the master unit, needle 41 for all practical photographic exposure purposes will be stationary, although the dash pot arrangement will allow it to be moved slowly and conjointly with needle 40 into positions of equilibrium by the energization of photo-electric cell 2 caused by sustained illumination of it. The circuits of relays 24 and 26 will thus be closed to effect energization of the light source 25 and camera shutter release 27, as described in connection with Figure 1.

While the double galvanometer 4 may be of any suitable or preferred specific construction, examples of known constructions which may be followed in producing the same are illustrated and described in prior Patents Nos. 2,235,390; 2,116,950; 840,569 and 644,859. Each of said patents discloses an electrical measuring instrument of the galvanometer type having two pointers, and in order to adapt any one of the same to the purpose of the present invention all that is required is to provide duplicate actuating coils for the two pointers, to provide one of the pointers with any suitable means such as a small vane operating in a dash pot 43 or even in the air to retard its movement, and to provide suitable contacts on one of the pointers to be bridged by the other pointer when the non-retarded pointer approaches within a predetermined distance of the retarded pointer. The circuit wires may be connected with the contacts by means of very small, flexible, light-weight conductors directly connected with said contacts as indicated in Fig. 3, or they may be connected with said contacts through slip rings on the arbor of the contact-carrying pointer.

A typical arrangement of master and slave units about a scene is shown in Figure 4, in which a slave unit camera 28 is located in one position, a slave unit flash globe 25 is placed in another position, and a slave unit having both a camera 28 and a flash globe 25 is shown in still another location. The master unit is represented as of the type shown in Figure 1, including both a slave unit energizing light source, a scene illuminating light source, and a camera.

What I claim as my invention is:

1. A system for photographing large audiences and other scenes by artificial light, said system comprising a master unit including a wave transmitter and control means operable at will to effect energization of said wave transmitter, and at least one slave unit including a light source disposed to illuminate the scene, a camera arranged to photograph the scene and incorporating a shutter, and control means for said slave unit light source and for said camera shutter physically uninterconnected with the control means of the master unit, said slave unit control means incorporating a receiver responsive to radiations from the master unit wave transmitter to be energized by the transmitter's wave, and operable when energized to effect substantially simultaneously energization of said light source for illumination of the scene and actuation of said camera shutter for uncovering to the scene a sensitized surface within the camera.

2. A system for photographing large audiences and other scenes by artificial light, said system comprising a master unit including a light source and control means operable at will to effect energization of said light source, and at least one slave unit including a light source disposed to illuminate the scene, a camera arranged to photograph the scene and incorporating a shutter, and control means for said slave unit light source and for said camera shutter physically uninterconnected with the control means of the master unit, said slave unit control means incorporating a photo-sensitive device disposed to receive light from the master unit light source, and operable when energized to effect substantially simultaneously energization of its related light source for illumination of the scene and actuation of said camera shutter for uncovering to the scene a sensitized surface within the camera.

3. A system for photographing large audiences and other scenes, said system comprising a master unit including a slave unit energizing light source, a light source of the flash type disposed to illuminate the scene, control means operable at will to initiate simultaneously energization of both said light sources, and time-delay means interposed between said control means and said flash light source to delay energization of said flash light source until slightly after energization of said slave unit energizing light source, and at least one slave unit including means to effect photographic exposure to the scene of a sensitized surface and control means therefor physically uninterconnected with the control means of the master unit, said slave unit control means incorporating a photo-sensitive device disposed to receive light from the master unit light source and a relay energizable by said photo-sensitive device and operable when energized to effect operation of said photographic exposure means for accomplishing such photographic exposure of the sensitized surface simultaneously with illumination of the scene by said master unit flash light source, by reason of the operation of said time-delay means.

4. A system for photographing large audiences and other scenes by artificial light, said system comprising a master unit including a slave unit energizing light source, a light source of the flash type disposed to illuminate the scene, control means operable at will to initiate simultaneously energization of both said light sources, and time-delay means interposed between said control means and said flash light source to delay energization of said flash light source until slightly after energization of said slave unit energizing light source, and at least one slave unit including a light source disposed to illuminate the scene and control means therefor physically uninter-connected with the control means of the master unit, said slave unit control means incorporating a photo-sensitive device disposed to receive light from the master unit light source and a relay energizable by said photo-sensitive device and operable when energized to effect energization of said slave unit light source for illumination of the scene thereby simultaneously with illumination thereof by said master unit flash light source, by reason of the operation of said time-delay means.

5. The photographing system of claim 4 in which the slave unit also includes a camera arranged to photograph the scene and incorporating a shutter, and a second relay energizable by the photo-sensitive device and operable when energized to effect actuation of said camera shutter for uncovering to the scene a sensitized surface within the camera simultaneously with illumination of the scene by the master unit flash light source and the slave unit light source.

6. A system for photographing large audiences and other scenes by artificial light, said system comprising a master unit including a slave unit energizing light source of the flash type, a second light source of the flash type disposed to illuminate the scene, control means operable at will to initiate simultaneously energization of both said light sources, and time-delay means interposed between said control means and said second flash light source to delay energization of such light source until slightly after energization of said first light source, and at least one slave unit including a light source of the flash type disposed to illuminate the scene and control means therefor physically uninterconnected with the control means of the master unit, said slave unit control means incorporating a photo-sensitive device disposed to receive light from said first master unit flash light source and a relay energizable by said photo-sensitive device and operable when energized to effect energization of said slave unit flash light source for peak illumination of the scene thereby simultaneously with peak illumination thereof by said second master unit flash light source, by reason of the operation of said time-delay means.

7. A system for photographing large audiences and other scenes, said system comprising a master unit including a light source and control means operable at will to effect energization of said light source, and at least one slave unit including means to effect photographic exposure to the scene of a sensitized surface and control means therefor physically uninterconnected with the control means of the master unit, said slave unit control means incorporating a photo-sensitive device disposed to receive light from the master unit light source and a circuit operable when energized to effect operation of said photographic exposure means for accomplishing such photographic exposure of the sensitized surface, said circuit including switch means incorporating two switch elements movable conjointly by energization of said photo-sensitive device upon exposure to sustained light and movable relative to each other into circuit closing position by said photo-sensitive device upon energization thereof by light from said master unit light source.

8. The system of claim 7 in which the switch means operable by the photo-sensitive device is a galvanometric device incorporating two juxtaposed and electrically connected galvanometer units and the switch elements are two needles, each moved by one of the galvanometer units, and carrying cooperating contacts, which needles are movable conjointly by continued energization of the photo-sensitive device into adjacent positions wherein the contacts are spaced apart, and means to delay movement of one of said needles for movement of the other of said needles relative thereto to engage the circuit contacts by a sudden increase in energization of the photo-sensitive device effected by light from the master unit light source.

BENJAMIN H. WILDMAN.

REFERENCES CITED

The following references are of record in the file of this patent:

UNITED STATES PATENTS

| Number | Name | Date |
|---|---|---|
| 1,917,245 | Edwards | July 11, 1933 |
| 1,936,595 | Goddard | Nov. 28, 1933 |